(12) United States Patent
Oda et al.

(10) Patent No.: US 6,426,579 B1
(45) Date of Patent: Jul. 30, 2002

(54) PERMANENT MAGNET TYPE ROTARY ELECTRIC MACHINE AND ELECTRICALLY DRIVEN VEHICLE USING THE SAME

(75) Inventors: Keiji Oda; Suetaro Shibukawa, both of Hitachinaka (JP)

(73) Assignees: Hitachi, Ltd., Tokyo; Hitachi Car Engineering Co., Ltd., Hitachinaka, both of (JP)

(*) Notice: Subject to any disclaimer, the term of this patent is extended or adjusted under 35 U.S.C. 154(b) by 0 days.

(21) Appl. No.: 09/472,519

(22) Filed: Dec. 27, 1999

(30) Foreign Application Priority Data

Dec. 25, 1998 (JP) .............................. 10-369970

(51) Int. Cl.[7] .................................................. H02K 1/22
(52) U.S. Cl. .............................. 310/261; 310/89; 310/91
(58) Field of Search .................................. 310/156, 261, 310/268, 254, 168, 67 R; 360/99.08, 98.07; 29/896–598

(56) References Cited

U.S. PATENT DOCUMENTS

| 4,639,627 A | * | 1/1987 | Takekoshi et al. | 310/156 |
| 4,697,114 A | * | 9/1987 | Ameniya et al. | 310/156 |
| 4,918,831 A | * | 4/1990 | Kilman | 29/598 |
| 5,008,576 A | * | 4/1991 | Lee | 310/166 |
| 5,010,266 A | * | 4/1991 | Uchida | 310/156 |
| 5,200,662 A | * | 4/1993 | Tagamai et al. | 310/261 |
| 5,397,951 A | * | 3/1995 | Uchida et al. | 310/156 |
| 5,841,212 A | * | 11/1998 | Mita et al. | 310/156 |
| 5,990,592 A | * | 11/1999 | Miura et al. | 310/156 |
| 6,034,460 A | * | 3/2000 | Tajima et al. | 310/179 |
| 6,049,153 A | * | 4/2000 | Nishiyama et al. | 310/156 |
| 6,084,330 A | * | 7/2000 | Fisher et al. | 310/91 |
| 6,133,662 A | * | 10/2000 | Matsunobu et al. | 310/156 |

* cited by examiner

*Primary Examiner*—Tran Nguyen
(74) *Attorney, Agent, or Firm*—Crowell & Moring LLP

(57) ABSTRACT

A plurality of permanent magnets 6 are embedded in a cylindrical rotor core 8 and arranged in a circumferential direction of the rotor core 8. A pair of side rings 81 are mounted on the axial ends of the rotor core 8. The outer diameter of each side ring 81 is set smaller than the outer diameter of the rotor core 8. With this structure, an eddy current generated in each side ring 81 can be suppressed to thereby prevent abnormal heating and accordingly prevent thermal demagnetization of the permanent magnets 6.

1 Claim, 4 Drawing Sheets

PERMANENT MAGNET TYPE ROTARY ELECTRIC MACHINE AND ELECTRICALLY DRIVEN VEHICLE USING THE SAME

BACKGROUND OF THE INVENTION

The present invention relates to a compact, lightweight, high-torque permanent magnet type rotary electric machine suitable for use at high temperatures, and also to an electrically driven vehicle using the rotary electric machine.

A driving motor for use in an electrically driven vehicle, especially, in an electric vehicle is desired to have a compact, lightweight configuration and high efficiency, because the capacity of a battery mounted on the electric vehicle is limited and it is necessary to ensure a sufficient distance traveled by the capacity of the battery once fully charged.

To make a motor compact and lightweight, it is desired to be fit for high-speed rotation. Further, as a high-efficient motor, a permanent magnet motor is recommendable rather than a DC motor and an induction motor. In particular, as compared with a surface magnet motor having permanent magnets on the outer circumferential surface of a rotor, a so-called internal magnet motor having a permanent magnet holding portion in a steel plate, e.g., a silicon steel plate, having a permeability higher than that of permanent magnets is suitable for the high-efficient motor. The reason is that the internal magnet motor can be operated up to high speeds by field weakening control and can be operated with high efficiency by field weakening control.

Further, as compared with the rotor of the surface magnet motor, the rotor of the internal magnet motor has an advantage such that the rotational strength of the rotor is determined by the strength of the silicon steel plate, resulting in high reliability in high-speed rotation. An example of such a motor configuration is disclosed in Japanese Patent Laid-open No. 5-76146.

The motor configuration disclosed in this publication is such that permanent magnets are embedded in a rotor core formed of a magnetic material having a permeability higher than that of the permanent magnets, and that auxiliary magnetic poles composed of the permanent magnets and the rotor core are arranged in a circumferential portion of the rotor core. By forming such an internal magnet configuration that the permanent magnets are embedded in the rotor core formed of a magnetic material having a permeability higher than that of the permanent magnets, field weakening control can be performed and the motor can be operated with high efficiency up to a high-speed region.

However, the motor configuration disclosed in the above publication has no consideration on a fixing method for the permanent magnets, especially, on a fixing method for the permanent magnets in the axial direction of the rotor core. Although the above publication describes that the permanent magnets are bonded in holes, there is a possibility that the permanent magnets may axially escape from the holes because of a reduction in adhesive strength by bonding only in the case of a rotary electric machine to be operated at high temperatures.

To cope with this problem, a pair of retainer plates (which will be hereinafter referred to as side rings) for preventing the escape of the permanent magnets are mounted on the axial ends of the rotor. Each side ring is formed of a nonmagnetic material to prevent short of magnetic flux. However, in the case that each side ring is formed of a metal material, an eddy current is generated in each side ring by a change in magnetic flux from stator windings, because of conductivity of the metal material, causing abnormal heating of each side ring. Accordingly, there is a possibility of high-temperature demagnetization of the permanent magnets due to the heat from each side ring.

SUMMARY OF THE INVENTION

It is accordingly an object of the present invention to provide a permanent magnet type rotary electric machine which can prevent thermal demagnetization of the permanent magnets to thereby effect a reduction in size and weight and a high torque.

It is another object of the present invention to provide an electrically driven vehicle using the permanent magnet type rotary electric machine.

According to an aspect of the present invention, the outer diameter of each of a pair of retainer plates mounted on the axial ends of a rotor core is set smaller than the outer diameter of the rotor core, thereby suppressing the generation of an eddy current in each retainer plate due to magnetic flux from stator windings.

Preferably, the difference between the outer diameter of the rotor core and the outer diameter of each retainer plate is set to ½ or more of the difference between the inner diameter of the stator core and the outer diameter of the rotor core.

According to another aspect of the present invention, each retainer plate is formed of a metal material having a resistivity of 10 $\mu\Omega$cm or higher, thereby suppressing the generation of an eddy current in each retainer plate due to magnetic flux from the stator windings.

According to a further aspect of the present invention, the outer diameter of each retainer plate is set smaller than the outer diameter of the rotor core, and each retainer plate is formed of a metal material having a resistivity of 10 $\mu\Omega$cm or higher, thereby suppressing the generation of an eddy current in each retainer plate due to magnetic flux from the stator windings.

According to a still further aspect of the present invention, each retainer plate is a nonmagnetic member formed of a nonmetal material, thereby suppressing the generation of an eddy current in each retainer plate due to magnetic flux from the stator windings.

According to a still further aspect of the present invention, there is provided an electrically driven vehicle comprising a battery for supplying a DC voltage; an inverter for converting the DC voltage supplied from the battery into an AC voltage; and a permanent magnet type rotary electric machine for outputting a drive torque for driving the vehicle at the AC voltage. The permanent magnet type rotary electric machine in this electrically driven vehicle is the permanent magnet type rotary electric machine according to the present invention.

EXPLANATION OF REFERENCE NUMERALS

Figure 1:
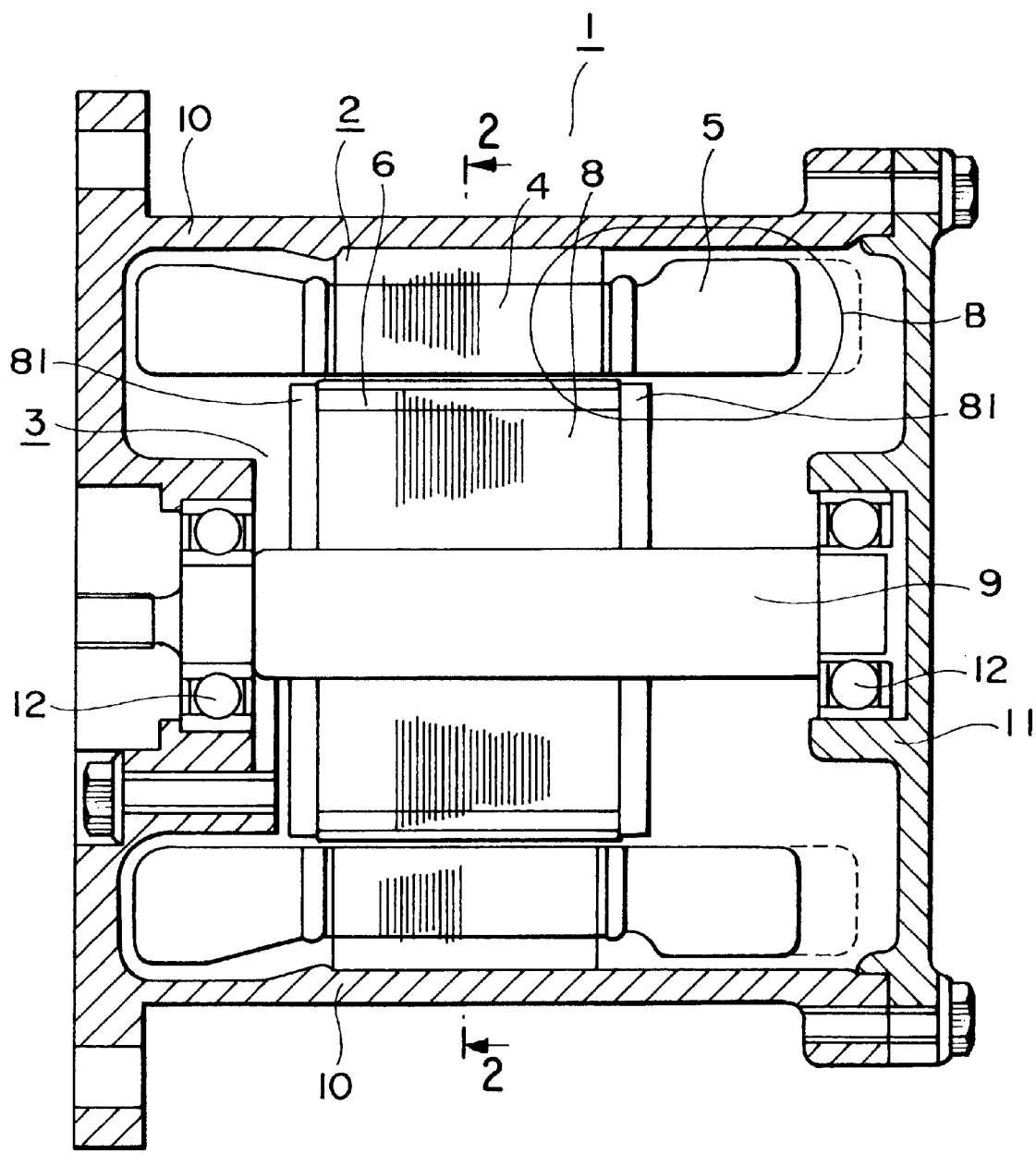
FIG. 1 is an axial sectional view of a permanent magnet type rotary electric machine according to a preferred embodiment of the present invention.

1: rotary electric machine 2: stator 3: rotor 4: stator core 5: stator windings 6: permanent magnets 8: rotor core 81: side rings 9: rotating shaft 10: housing 11: end bracket 12: bearings

DESCRIPTION OF THE PREFERRED EMBODIMENTS

There will now be described a permanent magnet type rotary electric machine and an electrically driven vehicle using the same according to a preferred embodiment of the present invention with reference to the drawings.

Figure 2:
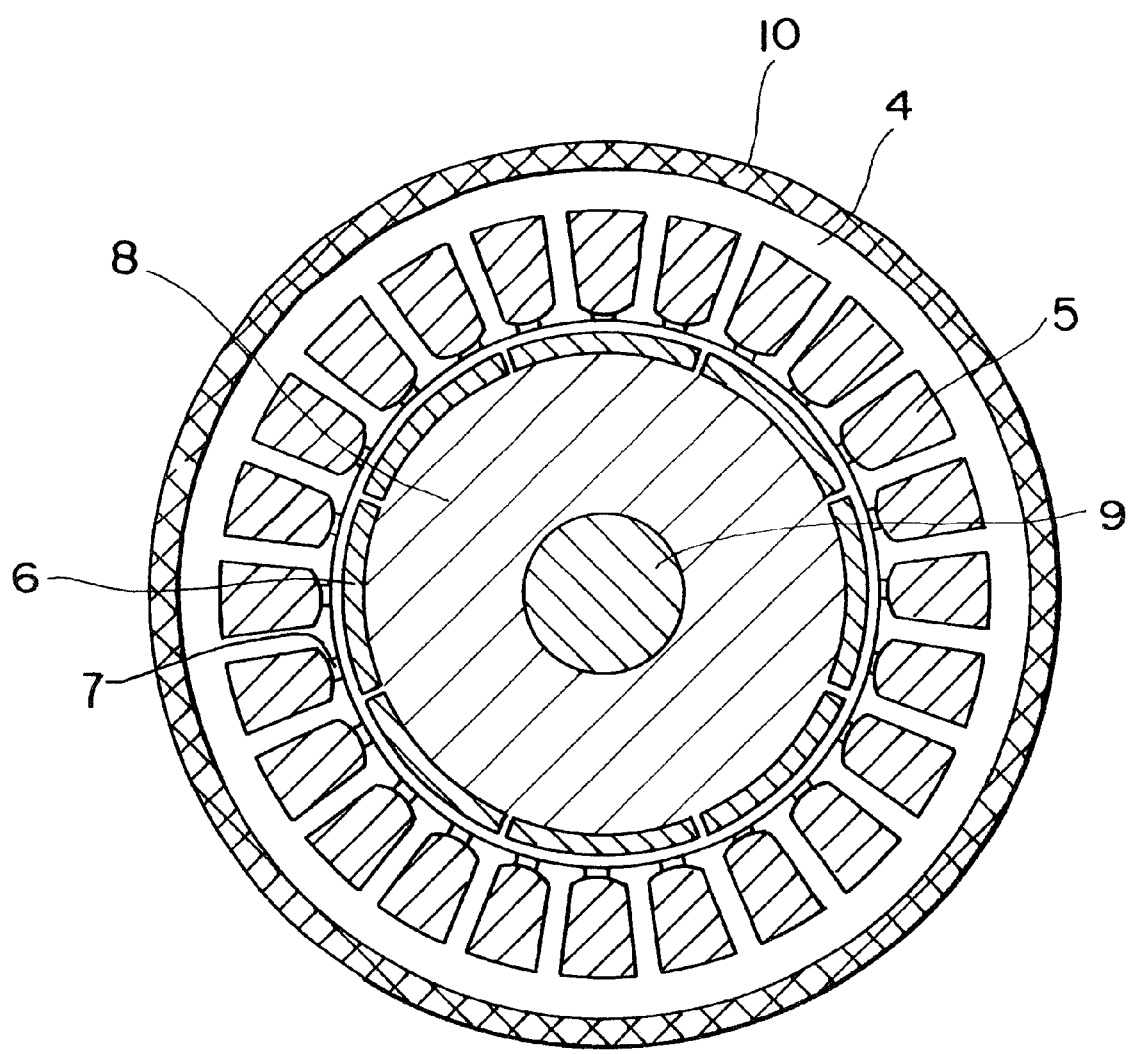
FIG. 2 is a cross section taken along the line A—A in FIG. 1.

FIG. 1 is an axial sectional view of a permanent magnet type rotary electric machine (which will be hereinafter referred to simply as a rotary electric machine) 1 according to a preferred embodiment of the present invention, and FIG. 2 is a cross section taken along the line A—A in FIG. 1. The rotary electric machine 1 is composed generally of a stator 2 and a rotor 3.

The stator 2 is composed of a cylindrical housing 10, an end bracket 11 fixed to the housing 10 by bolts, a cylindrical stator core 4 fixed to the inner circumferential surface of the housing 10, a plurality of stator windings 5 wound on the stator core 4 and a plurality of holes 7.

The rotor 3 is composed of a cylindrical rotor core 8, a plurality of permanent magnets 6 formed in the rotor core 8 near its outer circumferential surface, a rotating shaft 9 fixed to the rotor core 8 at its central portion, and a pair of side rings 81 mounted on the axial opposite ends of the rotor core 8 for retaining the rotor core 8 and the permanent magnets 6. The rotating shaft 9 is rotatably supported at its opposite ends to a pair of bearings 12 fixed to the end bracket 11 and the housing 10. The end bracket 11 is screwed to be fixed to the housing 10 of the rotator 2 side. Each of the permanent magnets 6 is arcuate as shown in FIG. 2, and they are arranged in the circumferential direction of the rotor core 8 with a given pitch. However, the shape of each permanent magnet 6 is merely illustrative and not limitative in the present invention.

Each side ring 81 is formed of a nonmagnetic material to prevent short of the magnetic flux generated by the permanent magnets 6. In the case that each side ring 81 is formed of a nonmagnetic metal material, it is affected by a change in the magnetic flux generated by the stator windings 5 because of the conductivity of the metal material, resulting in generation of an eddy current in each side ring 81 to cause abnormal heating of each side ring 81. This heat is transmitted to the permanent magnets 6 to possibly demagnetize the permanent magnets 6. Particularly in the case that each permanent magnet 6 is a rare-earth magnet, it has such a characteristic that demagnetization tends to occur at high temperatures. Therefore, it is necessary to prevent heating of each side ring 81, thereby preventing a reduction in performance of the rotary electric machine.

To reduce the influence of a change in magnetic flux from the stator windings 5 and thereby suppress the generation of an eddy current, the outer diameter of each side ring 81 is set smaller than the outer diameter of the rotor core 8.

Figure 3:
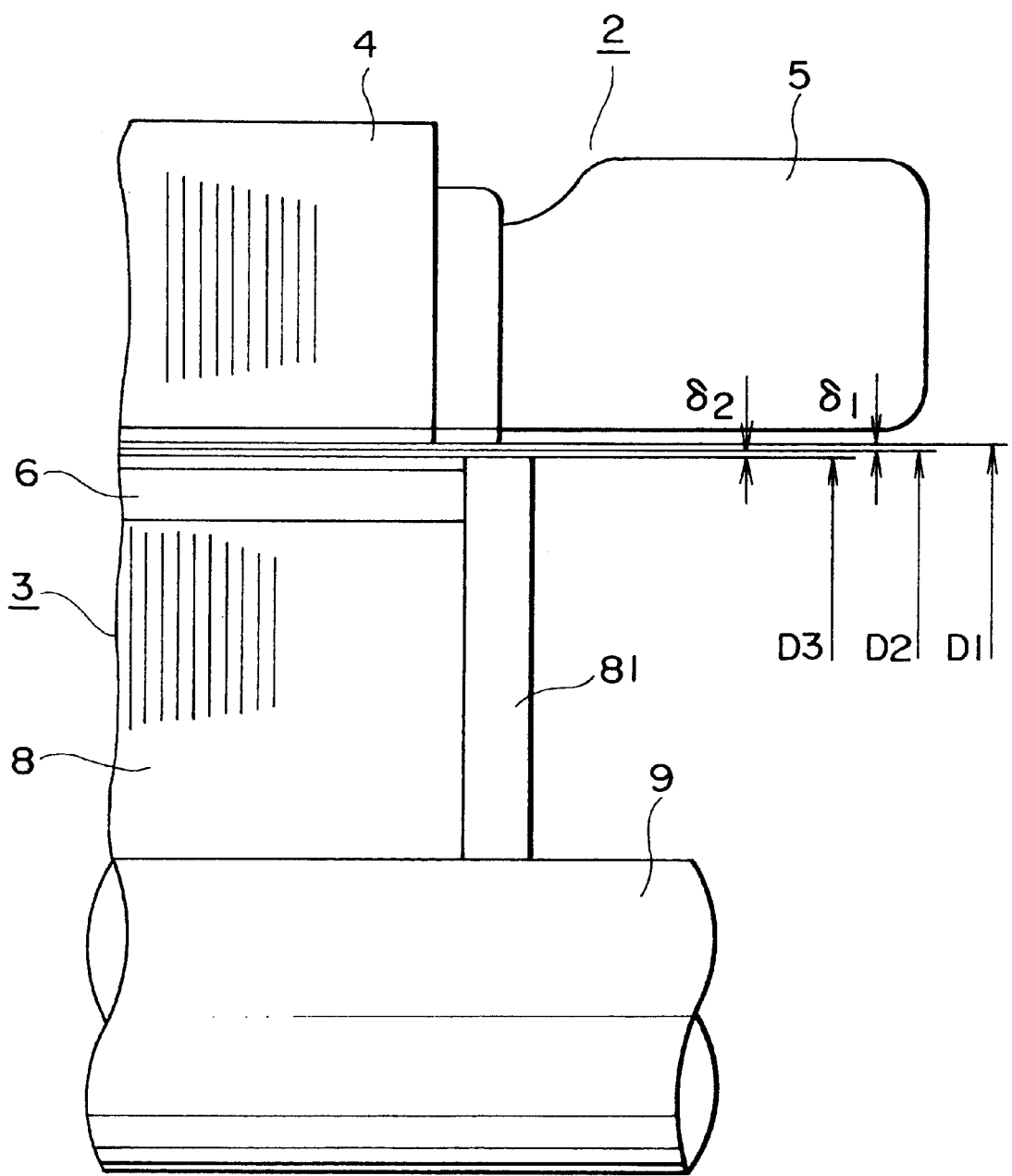
FIG. 3 is an enlarged view of a portion B shown in FIG. 1.

Such a diameter difference will now be described in more detail with reference to FIG. 3 which is an enlarged view of a portion B shown in FIG. 1. The difference between the outer diameter D2 of the rotor core 8 and the outer diameter D3 of each side ring 81 is set preferably to ½ or more of the difference between the inner diameter D1 of the stator core 4 and the outer diameter D2 of the rotor core 8.

The reason for this setting will now be described.

In considering the influence of an eddy current on each side ring 81 as a force F acting between the stator core 4 and the rotor core 8, the following equation holds.

$$F = k \cdot 1/\delta_1^2 \quad (1)$$

where $\delta_1$ is the difference between the inner diameter D1 of the stator core 4 and the outer diameter D2 of the rotor core 8, and k is the constant determined by a shape, a voltage input to the stator, etc.

Eq. (1) also holds for the difference $\delta_2$ between the outer diameter D2 of the rotor core 8 and the outer diameter D3 of each side ring 81, so that the relation between F and $\delta_2$ is shown in Table 1.

TABLE 1

| $\delta_2$ | F | Ratio of decrease in F to $\delta_2$ | |
|---|---|---|---|
| 0.5 | 4 k | — | the same as $\delta_1$ |
| 0.6 | 2.8 k | 70% | |
| 0.75 | 1.8 k | 45% | 1.5 times $67_1$ |
| 1.00 | 1.0 k | 25% | |
| 1.25 | 0.64 k | 16% | |

As understood from Table 1, the influence of an eddy current generated in each side ring 81 due to the magnetic flux generated by the stator windings 5 can be reduced to a half or less by setting $\delta_2$ to a value 1.5 times or more $\beta_1$, i.e., by setting the difference between the outer diameter D2 of the rotor core 8 and the outer diameter D3 of each side ring 81 to ½ or more of the difference between the inner diameter D1 of the stator core 4 and the outer diameter D2 of the rotor core 8.

When the eddy current becomes a half, the loss W is reduced to ¼ in accordance with the following equation.

$$W = I^2 \cdot R \quad (2)$$

where R is the electrical resistance.

Accordingly, a temperature rise of each side ring 81 is also reduced to ¼.

Thus, the influence of the eddy current is reduced in proportion to the square of a distance, so that it is preferable to maximize the difference $\delta_2$ between the outer diameter of the rotor core 8 and the outer diameter of each side ring 81.

It is sufficient to use a nonmagnetic material as the material of each side ring 81. However, if the nonmagnetic material is a material having a relatively low resistivity, such as copper and aluminum, the amperage of the eddy current is large. Accordingly, a nonmagnetic metal material having a relatively high resistivity of 10 $\mu\Omega$cm or higher, such as stainless steel, is preferable as the material of each side ring 81.

An increase in resistivity means an increase in electrical resistance R in the following equation.

$$I = E/R \quad (3)$$

where E is the voltage induced to each side ring.

In comparing aluminum (resistivity: 2.8 $\mu\Omega$cm) and stainless steel (resistivity: 10 $\mu\Omega$cm), the resistivity of stainless steel is higher than the resistivity of aluminum by 3.6 times. Accordingly, the amperage in stainless steel becomes 1/3.6 of the amperage in aluminum, and a temperature rise in stainless steel can be reduced to 1/13 of that in aluminum.

More preferably, the above-mentioned two features are combined. That is, the outer diameter of each side ring 81 is set smaller than the outer diameter of the rotor core 8, and the material of each side ring 81 is a metal material such as stainless steel having a resistivity of 10 μΩcm or higher, thereby enhancing the effect.

Further, if the operating temperature condition and the rotational strength of the rotary electric machine 1 are allowed, a nonmetal material such as resin may also be used as the material of each side ring 81. The resistivity of a resin material is much higher than that of a metal material, so that no eddy current flows in each side ring 81, thereby eliminating abnormal heating. In the case of applying a resin material to the opposite ends of the rotor core 8 to configure the side rings 81, a method of mounting platelike members of resin on the opposite ends of the rotor core 8 and a resin molding method of molding the opposite ends of the rotor core 8 with resin may be realized.

Having thus described a specific preferred embodiment employing an internal rotor, the present invention is applicable alto to a rotary electric machine employing an external rotor or the like having a structure such that both sides of magnets are sandwiched by a pair of side rings.

Further, the rotary electric machine of the present invention is effective in the case that it is used as a drive motor for an electrically driven vehicle.

Figure 4:
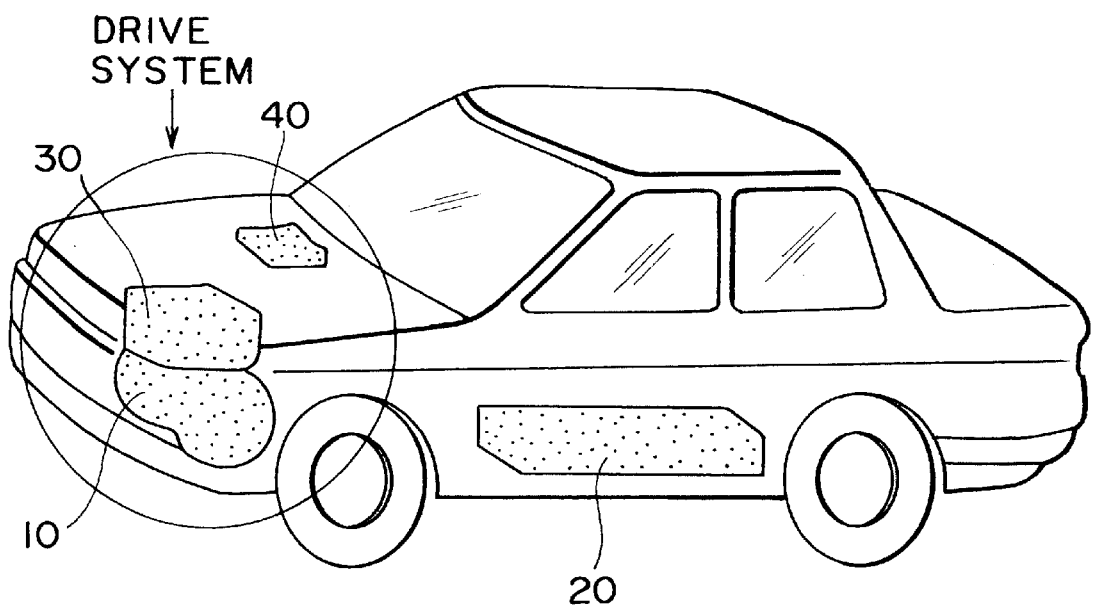
FIG. 4 is a perspective view showing a schematic configuration of an electric vehicle using the permanent magnet type rotary electric machine of the present invention.

As an example of the electrically driven vehicle using the rotary electric machine of the present invention as a drive motor, a schematic configuration of an electric vehicle is shown in FIG. 4. The electric vehicle includes a rotary electric machine 10 according to the present invention, a battery 20 for supplying a DC voltage, an inverter 30 for converting the DC voltage supplied from the battery into an AC voltage, and a control unit 40 for controlling a drive torque and a rotating speed of the rotary electric machine 10. Accordingly, the drive wheels of the vehicle are driven by the rotary electric machine 10 with a given torque and rotating speed controlled by the control unit 40.

The rotary electric machine of the present invention can suppress a temperature rise as compared with a conventional rotary electric machine. Accordingly, the rotary electric machine of the present invention can be reduced in size to contribute to mountability on the vehicle and weight reduction of the vehicle, thereby improving the performance of the vehicle.

According to the present invention, thermal demagnetization of the permanent magnets can be prevented to thereby effect a reduction in size and weight of the permanent magnet type rotary electric machine and also effect a high torque thereof.

Further, by applying the permanent magnet type rotary electric machine of the present invention to an electrically driven vehicle, the vehicle can be reduced in weight to thereby improve the performance of the vehicle.

What is claimed is:

1. A permanent magnet type rotary electric machine comprising:

a stator having a cylindrical stator core and a plurality of stator windings wound on said stator core; and a rotor having a cylindrical rotor core opposed to an inner circumferential surface of said stator core with a given gap defined therebetween, a plurality of permanent magnets formed in said rotor core and arranged in a circumferential direction of said rotor core, and a pair of retainer plates mounted on the axial ends of said rotor core, whereby generation of an eddy current in the retainer plates resulting from magnetic flux of the stator windings is suppressed;

wherein an outer diameter of each of said retainer plates is set smaller than an outer diameter of said rotor core and a difference between the outer diameter of said rotor core and the outer diameter of said retainer plates is at least ½ of a difference between an inner diameter of said stator core and the outer diameter of said rotor core, whereby generation of an eddy current in the retainer plates resulting from magnetic flux of the stator windings is suppressed.

\* \* \* \* \*